United States Patent [19]
Cudak et al.

[11] Patent Number: 6,157,632
[45] Date of Patent: Dec. 5, 2000

[54] LOW COMPLEXITY PROTOCOL METHOD DEVICE AND SYSTEM ROBUST IN THE PRESENCE OF BURSTED

[75] Inventors: Mark C. Cudak, McHenry; James R. Kelton, Oak Park; Phillip D. Rasky, Buffalo Grove; Bruce D. Mueller, Palatine; Kadathur S. Natarajan, Wilmette, all of Ill.

[73] Assignee: Motorola, Inc., Schaumburg, Ill.

[21] Appl. No.: 08/893,332

[22] Filed: Jul. 16, 1997

[51] Int. Cl.[7] ................................ H04J 3/00; H04B 7/212
[52] U.S. Cl. .......................... 370/348; 370/336; 370/345; 370/349; 370/337
[58] Field of Search ............................... 370/390, 428, 370/465, 468, 474, 473, 395, 470, 336, 337, 345

[56] References Cited

U.S. PATENT DOCUMENTS

5,517,507  5/1996  Needham et al. ...................... 371/32
5,684,791  11/1997  Raychaudhuri et al. ............... 370/278
5,729,541  3/1998  Hamalainen et al. ................. 370/337
5,799,012  8/1998  Ayerst et al. .......................... 370/336

*Primary Examiner*—Huy D. Vu
*Assistant Examiner*—M. Phan
*Attorney, Agent, or Firm*—Darleen J. Stockley

[57] ABSTRACT

The present invention provides a method/protocol (400, 800) and device (600; 700) for transmitting a synchronous stream of information, in a wireless, centrally controlled communication system. The method includes the steps of parsing the synchronous stream of information into a plurality of predetermined fixed sized blocks and transmitting/retransmitting each fixed size block in a predetermined window of time until one of: reception of each fixed size block is positively acknowledged and each corresponding predetermined window of time has elapsed.

39 Claims, 7 Drawing Sheets

LOW COMPLEXITY PROTOCOL METHOD DEVICE AND SYSTEM ROBUST IN THE PRESENCE OF BURSTED

FIELD OF THE INVENTION

The present invention relates to wireless communication systems, and more particularly, to wireless communication systems in frequency bands prone to bursted interference.

BACKGROUND OF THE INVENTION

The 2.4 GHz Industrial, Scientific, and Medical (ISM) Band provides unlicensed spectrum which is uniquely available throughout the world. In the U.S. it is governed by Federal Communications Commission (FCC) parts 15.209 and 15.247. In Europe, the European Telecommunications Standardization Institute (ETSI) ETS 300.328 outlines its requirements. In Japan, certain standards cover the band. Most of the rest of the world has also designated this band for common use. The dominant application of this frequency band is for consumer microwave ovens which on one-hand guarantees the continued existence of the band but on the other hand is a significant source of interference. This interference is bursty in nature. In spite of this challenge, this band provides an opportunity for in-home networks to develop one platform for universal deployment allowing the greatest economy of scale to be leveraged. However, other bands exist with similar interference characteristics that may also be useful for in-home networks.

The Digital European Cordless Telephone (DECT) system, the Personal Handyphone System (PHS), and other micro-cellular systems have been suggested for in-home applications and, at first glance, seem suitable with respect to the systems' integral cordless telephone function. However, the current frequency plans for DECT and PHS are only available regionally. Furthermore, rules governing the 2.4 GHz ISM, the only band with worldwide availability, is not conducive to PHS or DECT protocols. Both PHS and DECT cannot withstand the bursted interference. Interference aside, these micro-cellular systems contain significant additional complexity to handle community or campus deployment providing for intercell handoff and roaming capability. Similarly, the systems are designed to tolerate multipath distortion present even in the systems' small micro-cell environment which is significantly larger than an in-home pico-cell.

Thus there is a need for a low complexity protocol, device and system that is robust in the presence of bursted interference.

DETAILED DESCRIPTION OF A PREFERRED EMBODIMENT

The present invention provides a system for the in-home single pico-cell environment that is significantly less complex and more robust than existing systems. The system of the present invention may be utilized for in-home networks with a consumer-market based low-cost design philosophy. The system design trades spectral efficiency providing strong signal-to-noise ratios over its pico-cell coverage area and allowing near error-free transmission in the absence of interference. A low-complexity automatic repeat request (ARQ) has been designed to handle bursted interference co-resident in the ISM band. The physical layer and data link protocols are implementable in a custom silicon and only require a HC05-class microprocessor for configuration and initialization. The system provides high data-rates for data applications such as wireless-print sharing, cordless telephones, video-conferencing, and other wireless data applications while supporting low-cost low-complexity automated appliance applications.

Figure 3:
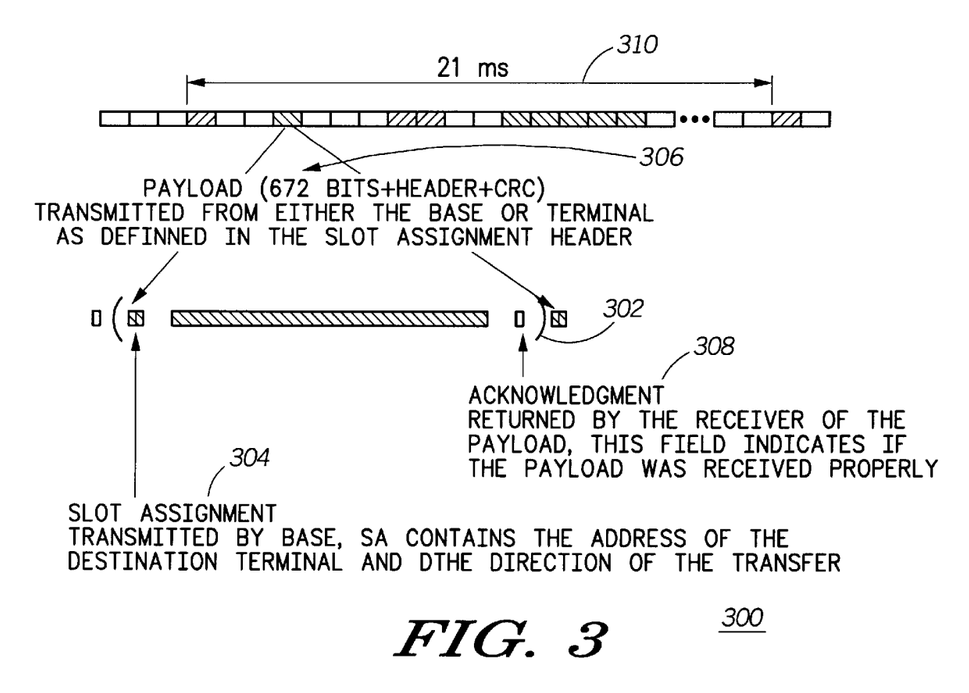
FIG. 3 is a schematic representation of a slot structure in accordance with the present invention.

The slot structure (302) is shown in FIG. 3, numeral 300. The slot consist of 3 fields, the slot assignment (304) field, the payload (306) field, and the acknowledgment (308) field. The slot assignment (304) field contains information which defines the payload (306) field and is always transmitted by the central controller. This information includes a segment defining the direction of the data. This segment determines whether the data is to be transmitted from the central controller to a terminal device or from a terminal device to the central controller. This information further includes an ID number defining the target terminal device. Special codes in this ID field are used to mark slots for certain special functions such as contention access and initial registration. This field also contains a cyclic redundancy check (CRC) used to determine if the slot assignment was received correctly.

The payload (306) field will normally carry payload information. This field can be transmitted by either a terminal device or the central controller depending on the direction segment of the slot assignment (304) field. This field also contains a header segment and a CRC. The CRC is used to detect errors in the reception of the payload field.

The acknowledgment (308) field is transmitted by the receiver of the payload (306) field as determined by the direction and terminal device ID number in the slot assignment (304) field. This field is not transmitted if the slot assignment (304) field CRC indicates an error. The acknowledgment field (308) is a multibit field and is used to convey an acknowledgment of correct reception of the payload (306) field (ACK) or a negative acknowledgment (NACK) in the case of improper reception. The acknowledgment (308) field consists of a predetermined bit pattern to indicate an ACK, and the bit inverse of this pattern to indicate a NACK. The payload field CRC is used to determine if the data was received properly. This field needs to be multibit to reduce the probability of improper decoding this field.

Figure 4:
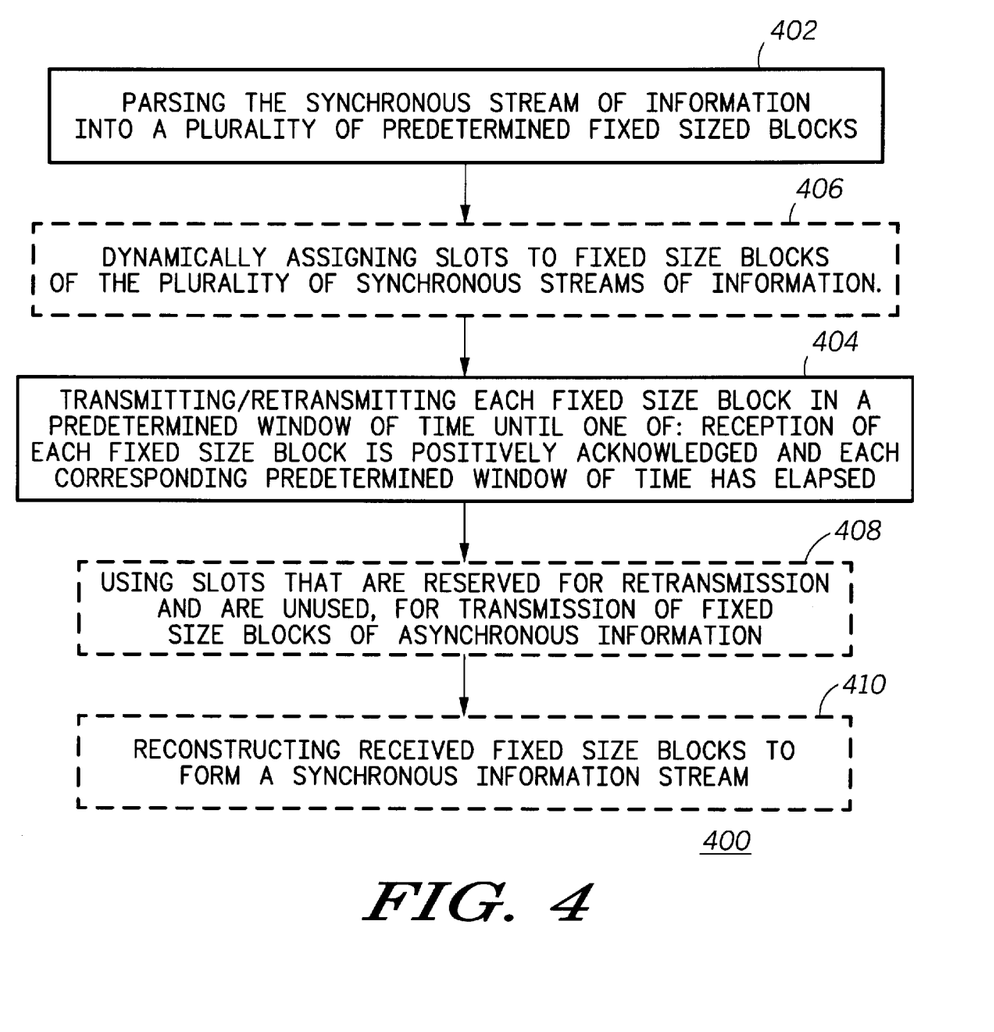
FIG. 4 is a flow chart showing one embodiment of a method in accordance with the present invention.

The process of transferring isochronous information in accordance with the present invention is shown in the flow chart of FIG. 4, numeral 400. The incoming synchronous information stream is first parsed into a series of predetermined, fixed length blocks in step (402). This is accomplished by buffering the incoming data stream for the period of fixed length blocks and bursting the information out of this buffer at the channel information rate. In practice, this block rate will usually correspond to the length of time required to fill an integer number of payload fields, or Nx672 bits where N is a positive integer. The duration of this window will define a time window (310). To minimize delay, the choice of N=1 is optimal. For 32 kbit/sec input information rate, this will yield a fixed duration of time window (310) of 21 milliseconds. Further, the windows for a given isochronous channel will be consecutive, one following the other. Each fixed length information blocks will then be dynamically assigned to a slot (406) or series of slots within the time window (310). Under control of the central controller, the blocks will be transmitted (404). If unsuccessful, the blocks will be dynamically reassigned to additional slots until the transmission is successful or the time window expires. If the time window (310) expires, the fixed length information block is dropped. Finally, the fixed length blocks are reconstructed (410) to recreate the synchronous information stream.

Upon examining the transmission process more closely, and assuming N=1 is used, an input information rate of 32 kbit/second, and a terminal device is transmitting, will result in a duration of time window (310) of 21 milliseconds. The parsing step (402) will form a stream of fixed length information blocks of a length equal to the payload of one slot. The slot assignment step (406) occurs in the central controller. Once a slot is assigned for the terminal device transmission, the central controller transmits the slot assignment field (304) indicating which terminal device in question should transmit. If the terminal device correctly receives the slot assignments, it will transmit the fixed length information in the payload field (306) of the same slot that the slot assignment field (304) appeared in. If the slot assignment field (304) was not received correctly as indicated by the CRC, the terminal device does not reliable know the ID or direction in the indicated by the slot assignment (304) and cannot transmit. After reception of the payload field (306), the central controller will transmit the acknowledged field (308). If the acknowledge field indicates reception was successful, the terminal device can stop monitoring the following slot assignment fields (304) until the beginning of the next window. This is due to the fact that for isochronous data transmission under the conditions outlined above it is known that the next block of information will not be ready until the start of the next window. If the acknowledgement field (308) indicates reception was unsuccessful, the terminal device will continue to monitor the slot assignment fields (304) and will transmit the fixed length information block in the payload field (306) whenever the slot assignment field (304) indicates it should. This process will continue until the acknowledge field indicates successful reception by the central controller or the current time window (310) expires. If the time window (310) expires, the present block is discarded and the terminal device moves on to the next block.

The situation for terminal reception is very similar. Again, at the start of time window (310), the terminal device will monitor the slot assignment field (304) for its ID and an indication that it should receive the payload field (306). If the slot assignment field is received correctly with the proper ID and direction, the terminal device will attempt to receive the payload field (306). If the CRC decodes correctly, the terminal device will transmit an ACK in the acknowledge field (308) and does not need to monitor the slot assignment (304) fields until the start of the next window. If the CRC indicates an error, a NACK is transmitted and the terminal device will continue to monitor the future slot assignment (304) fields, receiving the payload (306) field when so directed by the slot assignment (304) field and sending the appropriate message in the acknowledge fields (308). This continues until either the payload field (306) is received successfully or the end of time window (310) is reached. At the end of time window (310) the block is discarded and the next central control moves on to the next time window and fixed length information block. Note that the time windows for different isochronous channels and even for the different directions on the same channels do not have to be the begin and end at the same points. Further, to support different data rates these windows can also be of different lengths.

Note that if the transmission (reception) of the fixed length blocks succeeds in a small number of attempts, the transmission (reception) by the terminal unit has a small duty cycle. For practical devices, this allows the units to power down for a large percentage of the time, minimizing current drain. Further, with the protocol outlined above, the terminal units need not even monitor the channel from the time of a successful transmission and reception until the start of the next window. This will allow the terminal devices to shut down all transmit and receive functions for a high percentage of the time.

Many devices require some form of paging. For example, a cordless phone will need to periodically monitor the central controller to see if a call has arrived for it. To minimize current drain, it is desirable that this paging function only require the terminal device to receive a single slot at a very low frequency. For example, in a cordless phone application the terminal device could receive a slot only once every second to see if a call had arrived. This additional delay would be of no consequence to the phone's user and would allow the phone to run without recharging for a considerable length of time. However, the for this to occur the terminal device must know when this slot is to arrive. This problem can again be solved using the above protocol with a window time (310) of 1 second. The terminal device will wake up at the start of the window and monitor the slot assignment (304) field for a special ID indicating a paging channel. The payload field of this channel will contain a list of terminal device ID's which are being paged. If the terminal device's ID is present, the terminal device wakes up and begins a call setup procedure. If the ID is not present, the terminal device will return to a sleep mode until the start of the next paging window.

Figure 1:
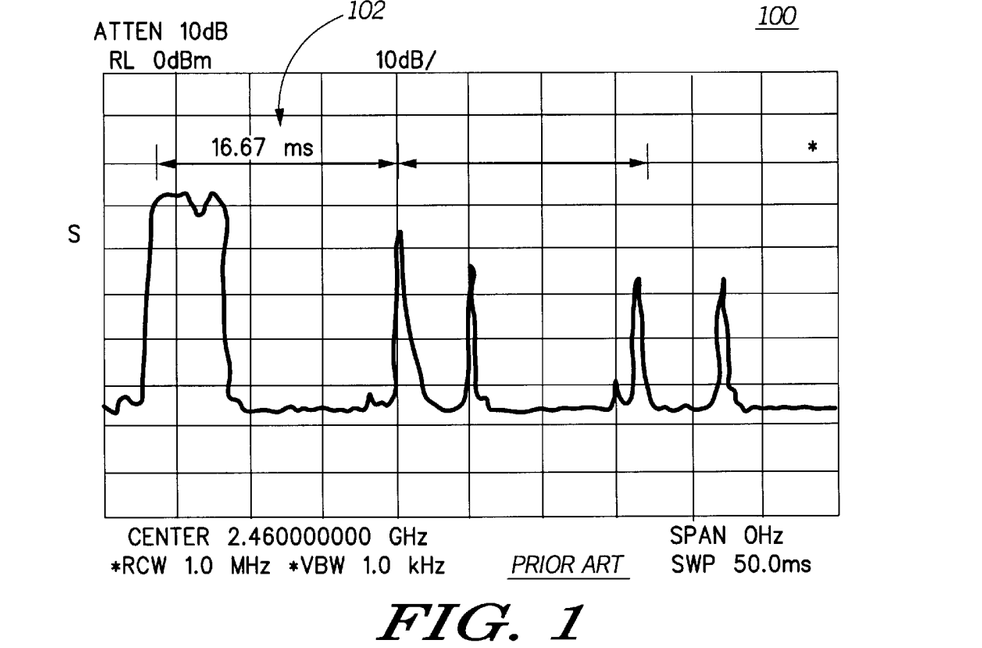
FIG. 1 is a graphical representation of typical measured interference power vs. time as is known in the art.
Figure 2:
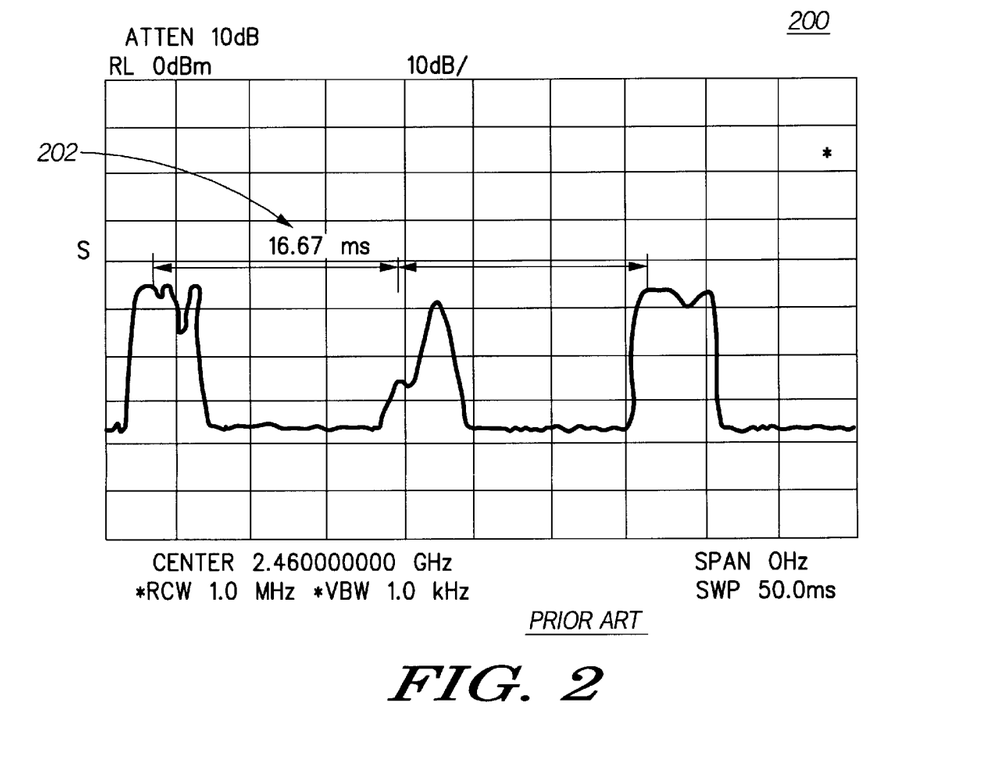
FIG. 2 is another graphical representation of typical measured interference power vs. time as is known in the art.

One of the main motivations behind the protocol described above is it's robustness to bursted interference. Typical examples of bursted interference are shown in FIGS. 1 and 2, numerals 100 and 200. This is an example of interference generated by microwave ovens in the 2.4 GHz ISM band in the countries with 60 Hz line power. Note that in countries with 50 Hz line power the situation is very similar with only repetition period changing from 16.67 to 20 milliseconds (102; 202).

Figure 5:
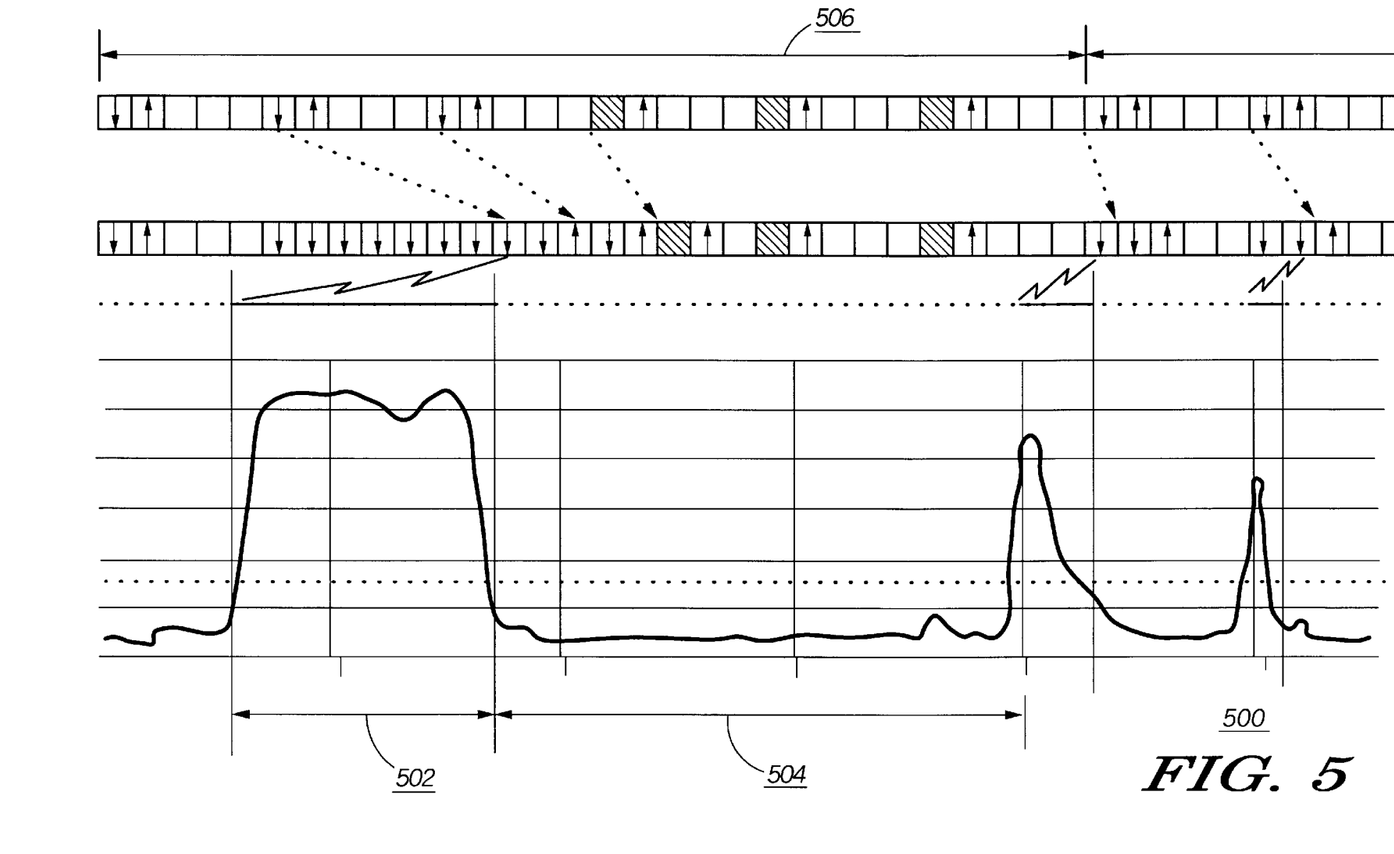
FIG. 5 is a graphical representation of an overlay of a slot structure onto bursted interference showing interference avoidance in accordance with the present invention.

An overlay of the proposed slot structure and this interference is shown in FIG. 5, numeral 500. Here the interference mitigation properties of this protocol become apparent. In the simplest realization, the system will simply retry a given slot until it is successfully acknowledged. Because the slot duration is small compared to the period low interference period (504), one is guaranteed that several slots exist which will experience no interference. Further, because the window time (506) is long compared to the high interference period (502), it is guaranteed that during window time (506), several slots exists which experience little interference, regardless of the relative temporal relationship of time window (506) and the interference periods (502 and 504). Because several slots exist with little interference during the window, data transmission will not be interrupted as long as the requested data rate can be accommodated by the remaining slots. The time window (506) duration of 21 milliseconds is workable because it is greater than the 50 Hz line rate of 20 milliseconds, but not much greater, providing a low delay. 672 bits per fixed size burst is equal to 32 kbits/second multiplied by 0.021 seconds.

The above system can also be used for transmission of asynchronous data. This is possible by using the slots which remain after all isochronous users are accommodated for the asynchronous users. For the terminal device, initiated packet transmission of both contention based and polled access are possible. The contention occurs by using a special reserved ID in the slot assignment (304) field. When this ID is observed, all terminal devices which want to contend for the channel can transmit a payload field (306) which includes, among other things, the terminal device ID and the number of packets to transmit. If the central controller receives the payload field (306) correctly, it will mark the slot assignment (304) field of the next unused slot as available for packet access by the terminal device with the ID received. The terminal device will then transmit packets on all so marked slots until the desired number of packets have been transmitted. The ARQ protocol for these transmission is a simple stop and wait. However, due to the quick response of the acknowledgments, this is very efficient.

For central controller initiated asynchronous data, the terminal devices either listen to every slot assignment (304) field or fall back to an isochronous announcement mechanism similar to the paging channel described for the cordless phone. The isochronous announcement consists of setting up a time window (310) long enough to allow low duty cycle reception by the terminal devices but short enough not to adversely impact delay. This announcement slot is again marked by a reserved ID in the slot assignment field (304). The terminal devices need only wake up at the beginning of the window and scan for this ID. When it occurs, the terminal devices will read the payload field (306) for that slot. This field will contain the ID's of all terminal devices for which packets are pending and the number of slots of data to be transmitted. When a terminal device observes it's ID, it will monitor all the slot assignments until the data is received.

The method provides for transmitting a synchronous stream of information, in a wireless, centrally controlled communication system and includes the steps of:
A) parsing (402) the synchronous stream of information into a plurality of predetermined fixed sized blocks; and B) transmitting/retransmitting (404) each fixed size block in a predetermined window of time until one of: reception of each fixed size block is positively acknowledged and each corresponding predetermined window of time has elapsed. Each predetermined window may be selected to be consecutive and non-overlapping in time. Also, each of the predetermined windows may be of equal duration. The synchronous stream may be selected to consist of a plurality of synchronous streams of information that are multiplexed into slots wherein each slot corresponds to a size of the predetermined fixed size blocks. In one embodiment slots may be dynamically assigned (406) to fixed size blocks of the plurality of synchronous streams of information. A predetermined number of slots are typically reserved (408) in the predetermined window of time for retransmission of unacknowledged fixed size blocks. Slots that are reserved for retransmission and are unused, may be used for transmission of fixed size blocks of asynchronous information. The method may further include reconstructing (410) received fixed size blocks to form a synchronous information stream.

FIG. 5, numeral 500, is a graphical representation of an overlay of a slot structure onto bursted interference showing interference avoidance in accordance with the present invention.

Figure 6:
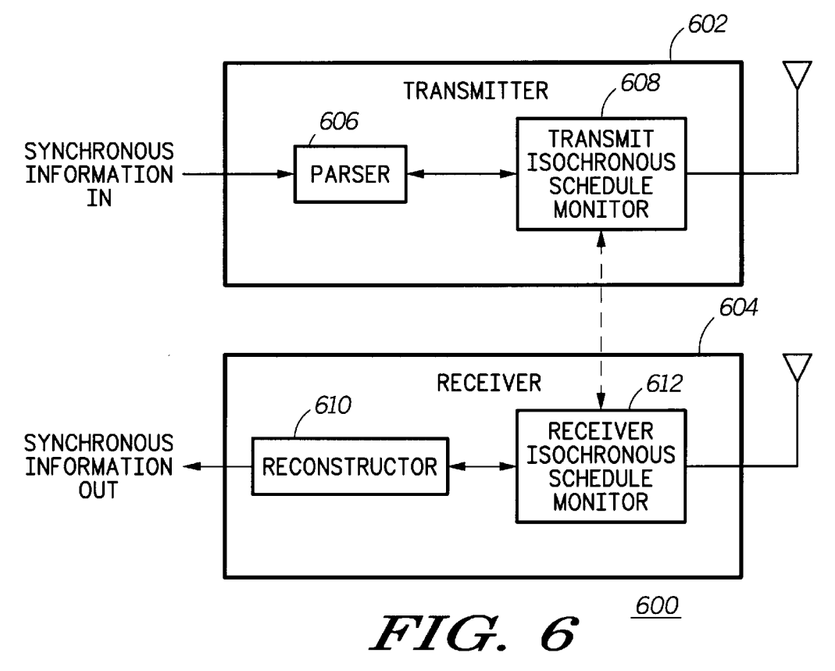
FIG. 6 is a block diagram of one embodiment of a terminal device in accordance with the present invention.

FIG. 6, numeral 600, is a block diagram of one embodiment of a terminal device in accordance with the present invention. The terminal device is utilized for transmitting or receiving a synchronous stream of information, in a wireless, centrally controlled communication system, and includes at least one of a transmitter (602) and a receiver (604), wherein, where the terminal device includes both a transmitter (602) and a receiver (604), the transmit isochronous schedule monitor (608) is coupled to the receive isochronous schedule monitor (612) to coordinate the scheduling set up by the central controller.

The transmitter (602) typically includes a parser (606) and a transmit isochronous schedule monitor (608). The parser (606) is coupled to receive the synchronous stream of information and is used for parsing the synchronous stream of information into a plurality of predetermined fixed sized blocks. The transmit isochronous schedule monitor (608) is coupled to the parser (606) and to receive control information and acknowledgment information from a central controller and is used for transmitting and retransmitting each fixed size block in a predetermined window of time until each received fixed size block is positively acknowledged or each corresponding predetermined window of time has elapsed.

The receiver (604) includes a reconstructor (610) and a receiver isochronous schedule monitor (612). The reconstructor (610) is coupled to receive the predetermined fixed size blocks and reconstructs the plurality of predetermined fixed sized blocks into a synchronous stream of information. The receiver isochronous schedule monitor (612) is coupled to the reconstructor (610) and is coupled to receive control information and payload information from a central controller. The receiver isochronous schedule monitor (612) transmits acknowledgment information for each fixed size block.

Where selected, each predetermined window is consecutive and non-overlapping in time. If desired, each of the predetermined windows may be of equal duration.

In one embodiment the transmit/receiver isochronous schedule monitor further mitigates errors when each predetermined window of time has elapsed.

In a preferred embodiment the receiver/transmit isochronous schedule monitor, upon receiving/transmitting a positive acknowledgment prior to an end of the predetermined window of time, discontinues reception of control/payload/acknowledgment information from the central controller until a next predetermined window of time.

Also, the transmit/receiver isochronous schedule monitor, upon receiving control information prior to an end of the predetermined window of time, may discontinues reception of control/payload/acknowledgment information from the central controller until a next predetermined window of time.

Where selected, a plurality of synchronous streams of information may be multiplexed into slots wherein each slot corresponds to a size of the predetermined fixed size blocks. Slots may be dynamically assigned to fixed size blocks of the plurality of synchronous streams of information. Typically, a predetermined number of slots are reserved in the predetermined window of time for retransmission of unacknowledged fixed size blocks. Generally, slots that are reserved for retransmission and are unused, are used for transmission of fixed size blocks of asynchronous information. Also, where desired, the receiver (604) may reconstruct received fixed size blocks to form a synchronous information stream.

Figure 7:
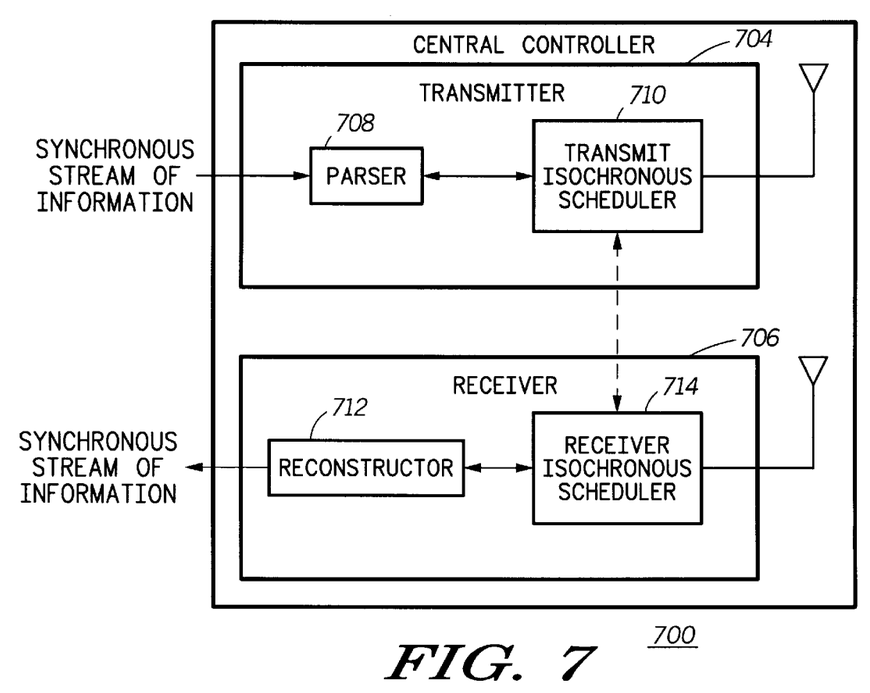
FIG. 7 is a block diagram of one embodiment of a central controller in accordance with the present invention.

FIG. 7, numeral 700, is a block diagram of one embodiment of a central controller in accordance with the present invention. The central controller (702) is utilized for transmitting or receiving a synchronous stream of information, in a wireless, centrally controlled communication system. The central controller (702) includes at least one of a transmitter (704) and a receiver (706).

The transmitter (704) includes a parser (708) and a transmit isochronous scheduler (710). The parser (708) is coupled to receive the synchronous stream of information and is utilized for parsing the synchronous stream of information into a plurality of predetermined fixed sized blocks. The transmit isochronous scheduler (710) is coupled to the parser (708) and receives acknowledgment information from a terminal device, and is used for transmitting control information and transmitting and retransmitting each fixed size block in a predetermined window of time until each fixed size block is either positively acknowledged or the corresponding predetermined window of time has elapsed.

The receiver (706) includes a reconstructor (712) and a receiver isochronous scheduler (714). The reconstructor (712) is coupled to receive the predetermined fixed size blocks, and is used for reconstructing the plurality of predetermined fixed sized blocks into a synchronous stream of information. The receiver isochronous scheduler (714) is coupled to the reconstructor (712) and is coupled to receive payload information from a terminal device. The receiver isochronous scheduler (714) transmits control information and transmitting acknowledgment information for each fixed size block. Each predetermined window may be consecutive and non-overlapping in time. Also, where selected, each of the predetermined windows may be of equal duration.

Where the central controller (702) includes both a transmitter (704) and a receiver (706), the transmit isochronous scheduler (710) is coupled to the receiver isochronous scheduler (714) to coordinate scheduling.

Where selected, the isochronous scheduler (714) further mitigates errors when each predetermined window of time has elapsed.

A plurality of synchronous streams of information may be multiplexed into slots wherein each slot corresponds to a size of the predetermined fixed size blocks. Typically the slots are dynamically assigned to fixed size blocks of the plurality of synchronous streams of information. A predetermined number of slots are generally reserved in the predetermined window of time for retransmission of unacknowledged fixed size blocks. Where slots that are reserved for retransmission are unused, the slots are typically used for transmission of fixed size blocks of asynchronous information.

The receiver isochronous scheduler (714) may also reconstruct received fixed size blocks to form a synchronous information stream.

Figure 8:
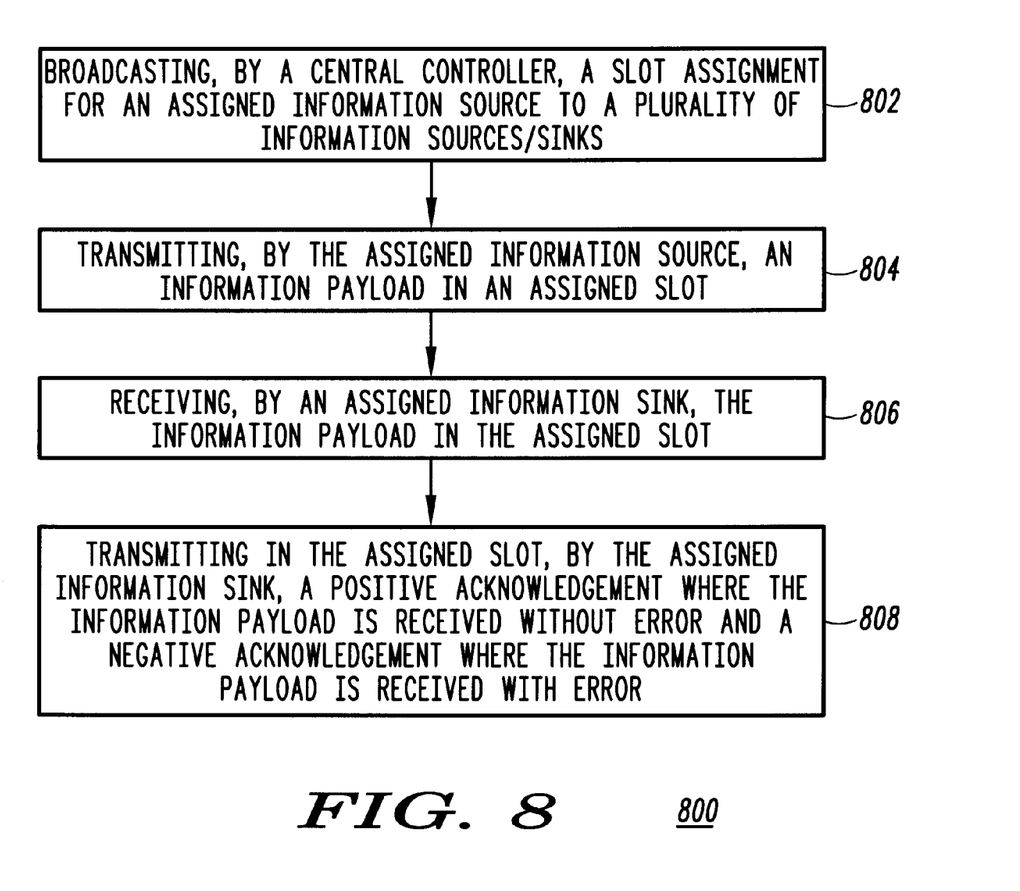
FIG. 8 is a flow chart showing another embodiment of a method in accordance with the present invention.

FIG. 8, numeral 800, is a flow chart showing another embodiment of a method in accordance with the present invention. The method for implementing a low complexity protocol in a wireless communication system, including the steps of: A) broadcasting (802), by a central controller, a slot assignment for an assigned information source to a plurality of information sources/sinks; B) transmitting (804), by the assigned information source, an information payload in an assigned slot; C) receiving (806), by an assigned information sink, the information payload in the assigned slot; D) transmitting (808) in the assigned slot, by the assigned information sink, a positive acknowledgment where the information payload is received without error and a negative acknowledgment where the information payload is received with error.

Figure 9:
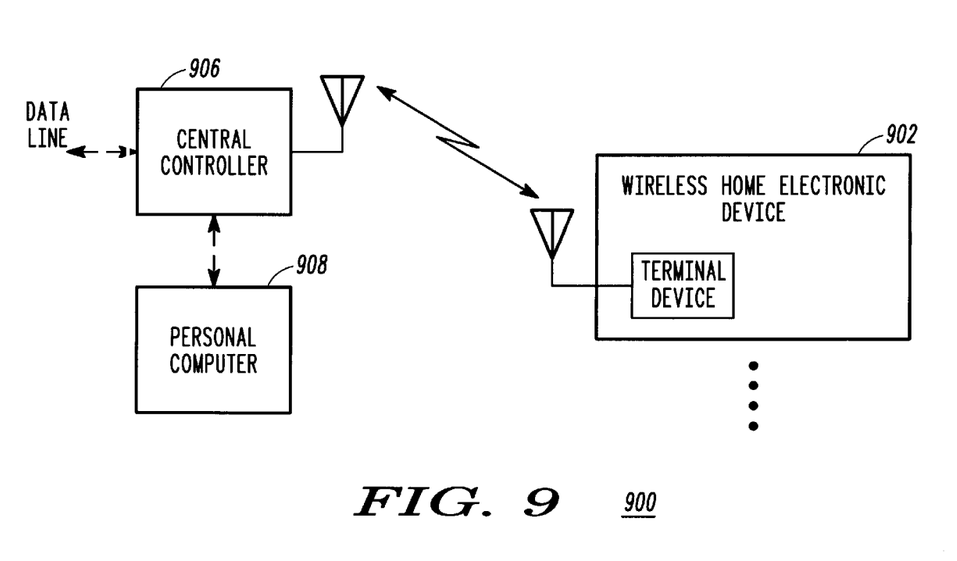
FIG. 9 is one embodiment of a wireless home electronic device in accordance with the present invention.

FIG. 9, numeral 900, is one embodiment of a wireless home electronic device in accordance with the present invention. The wireless home electronic device (902) has a terminal unit (904) for transmitting/receiving a synchronous stream of information, in a wireless, centrally controlled communication system. The terminal unit (904) includes at least one of a transmitter and a receiver as described above. The wireless home electronic device (902) may be, for example, an application specific integrated circuit, a gate array, a cordless telephone, a wireless printer, a video teleconferencing unit, or a wireless plaything (for example, a child's toy). A plurality of wireless home electronic devices (902) may communicate with a single central controller (906) which is optionally coupled to a personnel computer (908) and/or a data link.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of transmitting/receiving a synchronous stream of information, in a wireless, centrally controlled communication system, comprising at least one of a transmitter and a receiver:

the transmitter performing the steps of:
A) parsing the synchronous stream of information into a plurality of predetermined fixed sized blocks; and
B) transmitting/retransmitting each fixed size block in a predetermined window of time until one of: reception of each fixed size block is positively acknowledged and each corresponding predetermined window of time has elapsed;

the receiver performing the steps of:
A) receiving the predetermined fixed size blocks;
B) reconstructing the predetermined fixed sized blocks into a synchronous stream of information; and
C) transmitting acknowledgement information for each predetermined fixed size block.

2. The method of claim 1 wherein each predetermined window is consecutive and non-overlapping in time.

3. The method of claim 2 wherein each of the predetermined windows is of equal duration.

4. The method of claim 1 wherein the synchronous stream consists of a plurality of synchronous streams of information that are multiplexed into slots wherein each slot corresponds to a size of the predetermined fixed size blocks.

5. The method of claim 2 wherein slots are dynamically assigned to fixed size blocks of a plurality of synchronous streams of information.

6. The method of claim 3 wherein a predetermined number of slots are reserved in the predetermined window of time for retransmission of unacknowledged fixed size blocks.

7. The method of claim 6 including using slots that are reserved for retransmission and are unused, for transmission of fixed size blocks of asynchronous information.

8. The method of claim 1 further including reconstructing received fixed size blocks to form a synchronous information stream.

9. A terminal device for transmitting/receiving a synchronous stream of information, in a wireless, centrally controlled communication system, comprising at least one of a transmitter and a receiver:

the transmitter comprising:
A) a parser, coupled to receive the synchronous stream of information, for parsing the synchronous stream of information into a plurality of predetermined fixed sized blocks;
B) an isochronous schedule monitor, coupled to the parser and to receive control information and acknowledgment information from a central controller, for transmitting/retransmitting each fixed size block in a predetermined window of time until one of: reception of each fixed size block is positively acknowledged and each corresponding predetermined window of time has elapsed;

the receiver comprising:
A) a reconstructor, coupled to receive the predetermined fixed size blocks, for reconstructing the plurality of predetermined fixed sized blocks into a synchronous stream of information;
B) an isochronous schedule monitor, coupled to the reconstructor and coupled to receive control information and payload information from a central controller, for transmitting acknowledgment information for each fixed size block, wherein, where the terminal device includes both a transmitter and a receiver, the transmit isochronous schedule monitor is coupled to the receive isochronous schedule monitor to coordinate the scheduling set up by the central controller.

10. The terminal device of claim 9 wherein each predetermined window is consecutive and non-overlapping in time.

11. The terminal device of claim 9 wherein each of the predetermined windows is of equal duration.

12. The terminal device of claim 9 wherein the isochronous schedule monitor further mitigates errors when each predetermined window of time has elapsed.

13. The terminal device of claim 9 wherein the isochronous schedule monitor, upon receiving/transmitting a positive acknowledgment prior to an end of the predetermined window of time, discontinues reception of control/payload/acknowledgment information from the central controller until a next predetermined window of time.

14. The terminal device of claim 9 wherein the isochronous schedule monitor, upon receiving control information prior to an end of the predetermined window of time, discontinues reception of control/payload/acknowledgment information from the central controller until a next predetermined window of time.

15. The terminal device of claim 9 wherein a plurality of synchronous streams of information are multiplexed into slots wherein each slot corresponds to a size of the predetermined fixed size blocks.

16. The terminal device of claim 15 wherein slots are dynamically assigned to fixed size blocks of the plurality of synchronous streams of information.

17. The terminal device of claim 15 wherein a predetermined number of slots are reserved in the predetermined window of time for retransmission of unacknowledged fixed size blocks.

18. The terminal device of claim 17 wherein slots that are reserved for retransmission and are unused, are used for transmission of fixed size blocks of asynchronous information.

19. The terminal device of claim 9 further including reconstructing received fixed size blocks to form a synchronous information stream.

20. A central controller for transmitting/receiving a synchronous stream of information, in a wireless, centrally controlled communication system, comprising at least one of a transmitter and a receiver:

the transmitter comprising:
A) a parser, coupled to receive the synchronous stream of information, for parsing the synchronous stream of information into a plurality of predetermined fixed sized blocks;
B) a transmit isochronous scheduler, coupled to the parser and to receive acknowledgment information from a terminal device, for transmitting control information and transmitting/retransmitting each fixed size block in a predetermined window of time until one of: reception of each fixed size block is positively acknowledged and each corresponding predetermined window of time has elapsed;

the receiver comprising:
A) a reconstructor, coupled to receive the predetermined fixed size blocks, for reconstructing the plurality of predetermined fixed sized blocks into a synchronous stream of information;
B) a receive isochronous scheduler, coupled to the reconstructor and coupled to receive payload information from a terminal device, for transmitting control information and transmitting acknowledgment information for each fixed size block, wherein, where the central controller includes both a transmitter and a receiver, the transmit isochronous scheduler is coupled to the receiver isochronous scheduler to coordinate scheduling.

21. The central controller of claim 20 wherein each predetermined window is consecutive and non-overlapping in time.

22. The central controller of claim 20 wherein each of the predetermined windows is of equal duration.

23. The central controller of claim 20 wherein the isochronous scheduler further mitigates errors when each predetermined window of time has elapsed.

24. The central controller of claim 20 wherein a plurality of synchronous streams of information are multiplexed into slots wherein each slot corresponds to a size of the predetermined fixed size blocks.

25. The central controller of claim 24 wherein slots are dynamically assigned to fixed size blocks of the plurality of synchronous streams of information.

26. The central controller of claim 24 wherein a predetermined number of slots are reserved in the predetermined window of time for retransmission of unacknowledged fixed size blocks.

27. The central controller of claim 26 wherein slots that are reserved for retransmission and are unused, are used for transmission of fixed size blocks of asynchronous information.

28. The central controller of claim 20 further including reconstructing received fixed size blocks to form a synchronous information stream.

29. A wireless home electronic device having a terminal unit for transmitting/receiving a synchronous stream of information, in a wireless, centrally controlled communication system, wherein the terminal unit comprises at least one of a transmitter and a receiver:

the transmitter comprising:
- A) a parser, coupled to receive the synchronous stream of information, for parsing the synchronous stream of information into a plurality of predetermined fixed sized blocks;
- B) an isochronous schedule monitor, coupled to the parser and to receive control information and acknowledgment information from a central controller, for transmitting/retransmitting each fixed size block in a predetermined window of time until one of: reception of each fixed size block is positively acknowledged and each corresponding predetermined window of time has elapsed;

the receiver comprising:
- A) a reconstructor, coupled to receive the predetermined fixed size blocks, for reconstructing the plurality of predetermined fixed sized blocks into a synchronous stream of information;
- B) an isochronous schedule monitor, coupled to the reconstructor and coupled to receive control information and payload information from a central controller, for transmitting acknowledgment information for each fixed size block.

30. The wireless home electronic device of claim 29 wherein each predetermined window is consecutive and non-overlapping in time.

31. The wireless home electronic device of claim 30 wherein each of the predetermined windows is of equal duration.

32. The wireless home electronic device of claim 29 wherein the wireless home electronic device is at least one of:

- A) an application specific integrated circuit;
- B) a gate array;
- C) a cordless telephone;
- D) a wireless printer;
- D) a video teleconferencing unit; and
- E) a wireless plaything.

33. The wireless home electronic device of claim 29 wherein the isochronous schedule monitor further mitigates errors when each predetermined window of time has elapsed.

34. The wireless home electronic device of claim 29 wherein the isochronous schedule monitor, upon receiving a positive acknowledgment prior to an end of the predetermined window of time, discontinues reception of control/payload/acknowledgment information from the central controller.

35. The wireless home electronic device of claim 29 wherein a plurality of synchronous streams of information are multiplexed into slots wherein each slot corresponds to a size of the predetermined fixed size blocks.

36. The wireless home electronic device of claim 35 wherein slots are dynamically assigned to fixed size blocks of the plurality of synchronous streams of information.

37. The wireless home electronic device of claim 36 wherein a predetermined number of slots are reserved in the predetermined window of time for retransmission of unacknowledged fixed size blocks.

38. The wireless home electronic device of claim 37 wherein slots that are reserved for retransmission and are unused, are used for transmission of fixed size blocks of asynchronous information.

39. The wireless home electronic device of claim 29 wherein the reconstructor reconstructs received fixed size blocks to form a synchronous information stream.

* * * * *

UNITED STATES PATENT AND TRADEMARK OFFICE
CERTIFICATE OF CORRECTION

PATENT NO.    : 6,157,632  
DATED         : December 5, 2000  
INVENTOR(S)   : Cudak et al.

Page 1 of 1

It is certified that error appears in the above-identified patent and that said Letters Patent is hereby corrected as shown below:

Title page,
Title, after "Bursted" insert -- Interference --

ABSTRACT,
Line 1, delete the phrase, "The present invention provides a" and insert the word -- A -- in place thereof.

Signed and Sealed this

Twentieth Day of November, 2001

Attest:

*Nicholas P. Godici*

NICHOLAS P. GODICI
*Attesting Officer*     *Acting Director of the United States Patent and Trademark Office*